United States Patent
Serbest

(10) Patent No.: US 9,571,895 B2
(45) Date of Patent: *Feb. 14, 2017

(54) LOAD BALANCING MULTICAST NETWORK TRAFFIC USING VIRTUAL CHANNELS

(71) Applicant: AT&T Intellectual Property I, L.P., Atlanta, GA (US)

(72) Inventor: Yetik Serbest, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/840,770

(22) Filed: Aug. 31, 2015

(65) Prior Publication Data

US 2015/0373422 A1 Dec. 24, 2015

Related U.S. Application Data

(63) Continuation of application No. 12/571,124, filed on Sep. 30, 2009, now Pat. No. 9,124,513.

(51) Int. Cl.
| | |
|---|---|
| *H04L 12/26* | (2006.01) |
| *H04N 21/6405* | (2011.01) |
| *H04N 21/2385* | (2011.01) |
| *H04L 12/18* | (2006.01) |
| *H04L 12/761* | (2013.01) |
| *H04L 12/707* | (2013.01) |
| *H04N 21/2381* | (2011.01) |
| *H04N 21/24* | (2011.01) |
| *H04N 21/643* | (2011.01) |
| *H04N 21/438* | (2011.01) |

(52) U.S. Cl.
CPC .......... *H04N 21/6405* (2013.01); *H04L 12/18* (2013.01); *H04L 45/16* (2013.01); *H04L 45/24* (2013.01); *H04N 21/2381* (2013.01); *H04N 21/2385* (2013.01); *H04N 21/2402* (2013.01); *H04N 21/4383* (2013.01); *H04N 21/64322* (2013.01)

(58) Field of Classification Search
CPC ............ H04N 21/6405; H04N 21/4383; H04N 21/2385; H04N 21/2381; H04N 21/2402; H04N 21/64322; H04L 45/16; H04L 45/24; H04L 12/18
See application file for complete search history.

(56) References Cited

U.S. PATENT DOCUMENTS

| | | |
|---|---|---|
| 6,343,065 B1 | 1/2002 | Serbest et al. |
| 6,611,872 B1 | 8/2003 | McCanne |
| 6,782,490 B2 | 8/2004 | Maxemchuk et al. |

(Continued)

*Primary Examiner* — Brian O'Connor
(74) *Attorney, Agent, or Firm* — Jackson Walker L.L.P.

(57) ABSTRACT

A method and system for multicasting Internet-protocol television (IPTV) channels is disclosed. In order to receive desired IPTV channels, a first-hop router (FHR) may send a join message to a last-hop router (LHR) establishing multiple paths across a backbone network. The join message may specify mapping at least one virtual IPTV channel to a plurality of multicast channels, along with the desired IPTV channels. The multicast channels may then be transmitted in a round-robin manner over the multiple paths from the LHR to the FHR. A number of virtual IPTV channels may be modified in response to determining a loading profile over the multiple paths to maintain a balanced load among the multiple paths.

20 Claims, 7 Drawing Sheets

(56) References Cited

U.S. PATENT DOCUMENTS

| | | |
|---|---|---|
| 7,047,309 B2 | 5/2006 | Baumann et al. |
| 7,248,562 B2 | 7/2007 | Serbest et al. |
| 7,268,690 B2 | 9/2007 | Nguyen et al. |
| 7,359,322 B2 | 4/2008 | Khurana et al. |
| 7,478,183 B2 | 1/2009 | Pathak et al. |
| 7,570,637 B2 | 8/2009 | Serbest et al. |
| 7,586,844 B2 | 9/2009 | Serbest et al. |
| 7,668,081 B2 | 2/2010 | Hermsmeyer et al. |
| 7,693,171 B2 | 4/2010 | Gould |
| 7,697,525 B2 | 4/2010 | Zelig et al. |
| 7,734,730 B2 | 6/2010 | McCanne |
| 7,839,850 B2 | 11/2010 | Kompella |
| 7,899,915 B2 | 3/2011 | Reisman |
| 7,916,631 B2 | 3/2011 | Kamentsky et al. |
| 7,937,483 B2 | 5/2011 | Chen et al. |
| 8,018,934 B2 | 9/2011 | Liu |
| 8,112,774 B2 | 2/2012 | Olds |
| 8,116,336 B2 | 2/2012 | Jing et al. |
| 8,150,992 B2 | 4/2012 | Chapweske et al. |
| 8,181,210 B2 | 5/2012 | Amir et al. |
| 8,427,943 B2 | 4/2013 | Gahm et al. |
| 9,124,513 B2 * | 9/2015 | Serbest ............... H04L 12/18 |
| 2002/0064129 A1 | 5/2002 | Serbest et al. |
| 2004/0258069 A1 | 12/2004 | Serbest et al. |
| 2007/0083907 A1 | 4/2007 | Serbest |
| 2007/0121588 A1 | 5/2007 | Chen et al. |
| 2007/0230340 A1 | 10/2007 | Serbest et al. |
| 2007/0239879 A1 | 10/2007 | Serbest et al. |
| 2008/0114648 A1 | 5/2008 | Chen et al. |
| 2008/0271068 A1 | 10/2008 | Ou et al. |
| 2008/0291920 A1 | 11/2008 | Serbest et al. |
| 2008/0301745 A1 | 12/2008 | Liu et al. |
| 2009/0016361 A1 | 1/2009 | Serbest et al. |
| 2009/0055241 A1 | 2/2009 | Chen et al. |
| 2009/0190474 A1 | 7/2009 | Gahm et al. |
| 2009/0279431 A1 | 11/2009 | Baruah et al. |
| 2009/0296576 A1 | 12/2009 | Serbest et al. |
| 2010/0036963 A1 | 2/2010 | Gahm et al. |
| 2010/0057909 A1 | 3/2010 | Varadarajan et al. |
| 2011/0032814 A1 | 2/2011 | Wen et al. |
| 2011/0044339 A1 | 2/2011 | Kotalwar et al. |
| 2011/0075572 A1 | 3/2011 | Serbest |
| 2011/0075663 A1 | 3/2011 | Serbest |

* cited by examiner

LOAD BALANCING MULTICAST NETWORK TRAFFIC USING VIRTUAL CHANNELS

This application is a continuation of U.S. patent application Ser. No. 12/571,124, filed Sep. 30, 2009, issuing as U.S. Pat. No. 9,124,513 on Sep. 1, 2015, the entirety of which is incorporated by reference herein.

BACKGROUND

Field of the Disclosure

The present disclosure relates to multicasting of Internet-protocol television (IPTV) channels and, more particularly, to load balancing of multicast IPTV channels.

Description of the Related Art

Multicast IPTV channels may be transmitted over a backbone network using equal cost multicast paths (EC-MPs). The effective loading, or load distribution, of traffic across available ECMPs may be unbalanced using simple algorithms for channel distribution. Load balancing multicast IPTV traffic over ECMPs may be associated with complex and resource-intensive network management operations.

DESCRIPTION OF THE EXEMPLARY EMBODIMENTS

Figure 1:
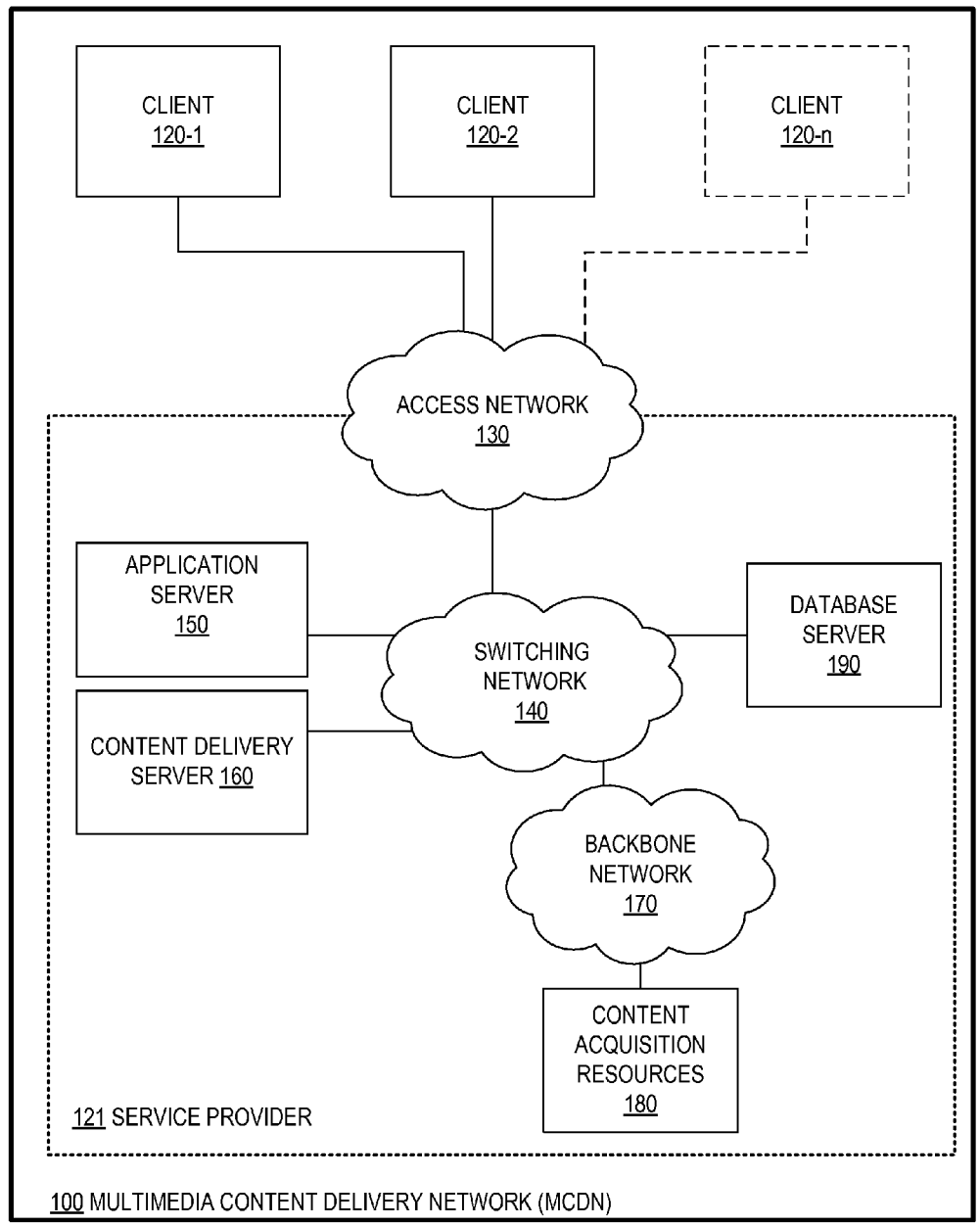
FIG. 1 is a block diagram of selected elements of an embodiment of a multimedia distribution network.

In one aspect, a disclosed method for multicasting IPTV channels over a multimedia content distribution network (MCDN) includes receiving a first join message associated with at least one MCDN client for viewing a selected IPTV channel, and selecting at least two multicast paths for receiving a plurality of multicast channels from a multicast source. The method may further include sending a second join message to the multicast source including an indication of the selected multicast paths, while the selected IPTV channel and at least one virtual IPTV channel may be mapped to the plurality of multicast channels. The method may still further include receiving each of the mapped plurality of multicast channels in a round-robin fashion over the selected multicast paths, while substantially no network traffic is received for the at least one virtual IPTV channel.

In specific embodiments, the IPTV channels may include high-definition television channels, standard definition television channels, and picture-in-picture television channels. In response to determining a loading profile of the selected multicast paths, the method may further include determining a number of virtual IPTV channels associated with the second multicast join message. The determined number of virtual IPTV channels may result in a balanced loading profile among the selected multicast paths.

In particular embodiments, the method also includes changing the number of virtual IPTV channels in the plurality of multicast channels in response to determining a change in the loading profile of the selected multicast paths. The first join message may be generated in response to a user indication of the selected IPTV channel using customer premises equipment (CPE) coupled to the MCDN. The first multicast join message may indicate a plurality of MCDN clients for receiving the selected IPTV channel. The multicast paths may be ECMPs.

In a further aspect, a disclosed network device for multicasting IPTV channels over an MCDN may include a processor, a local transceiver, and memory media accessible to the processor, including instructions executable by the processor. The processor executable instructions may be executable to receive a multicast join message specifying at least two ECMPs for sending a plurality of multicast channels, including an IPTV channel and a virtual IPTV channel mapped to the multicast channels, and sending each of the plurality of multicast channels in a round-robin sequence over the specified ECMPs. Substantially no network traffic may be transmitted for the virtual IPTV channel. The specified number of virtual IPTV channels may result in a balanced loading profile for network traffic distributed among the specified ECMPs.

In one embodiment, the network device may further include processor executable instructions to select the IPTV channel from a plurality of IPTV channels arriving from a multicast source. The plurality of multicast channels may include a plurality of IPTV channels and a plurality of virtual IPTV channels.

In yet another aspect, a disclosed computer-readable memory media includes executable instructions for multicasting IPTV channels over an MCDN. The instructions may be executable to receive a first join message for viewing a requested IPTV channel from an MCDN access network, the first join message being associated with at least one MCDN client, and select at least two ECMPs for receiving a plurality of multicast channels from an MCDN network device coupled to an IPTV channel source. The instructions may further be executable to send a second join message to the MCDN network device including an indication of the selected ECMPs, wherein the requested IPTV channel and at least one virtual IPTV channel are mapped to the plurality of multicast channels, and receive each of the mapped plurality of multicast channels in a round-robin manner over the selected ECMPs from the IPTV channel source via the MCDN network device, while substantially no network traffic is received for the at least one virtual IPTV channel. The second join message may be a Protocol Independent Multicast (PIM) join message.

The MCDN network device may be a last hop router with respect to the selected ECMPs, which may represent network paths over a backbone network. A plurality of IPTV channels and a plurality of virtual IPTV channels may be mapped to the plurality of multicast channels. In response to determining a loading profile for network traffic distributed among the selected ECMPs, the instructions may be executable to determine a number of virtual IPTV channels associated with the second join message.

In particular embodiments, the determined number of virtual IPTV channels may result in a balanced loading profile for network traffic distributed among the selected ECMPs. The memory media may further include instructions executable to adjust the number of virtual IPTV channels in the plurality of multicast channels in response to a change in the loading profile.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, the terms "multicast" or "multicasting" refer to a form of network addressing for the delivery of data to a group of destinations simultaneously. In Internet-protocol (IP) multicasting, such as an IPTV implementation, multicasting may occur at the IP routing level, where network routing devices create optimal distribution paths, also referred to as "multicast paths", for portions of data, also referred to as "packets" or "datagrams". The distribution paths link sources of multicast data to receivers of multicast data. In an IPTV multicast, a relatively small number of sources may deliver multimedia content, i.e., "IPTV channels", to a relatively large number of receivers, such as MCDN client systems, as will be described in detail below.

In addition, certain network protocols may be used to implement multicasting. In IP multicasting, an IP multicast group address may be used by sources and receivers to send and receive multimedia content. Sources may use the multicast group IP address as a destination address, while receivers may designate that they are interested in receiving data packets sent to that address. A receiver may accomplish this by sending a "join message" to a network routing device to join a multicast group receiving data packets sent to the multicast group IP address. One network protocol used by receivers to join a group is the Internet Group Management Protocol (IGMP), whose join message may be referred to as an "IGMP join message."

Once receivers have joined a multicast group, a multicast path for the group may be established. A common protocol for determining multicast paths from senders to receivers is the PIM, which also may involve sending a "PIM join message." Network routing devices may begin forwarding multicast data packets when a join message has been received. Network routing devices may send a join message when they wish to receive multicast packets.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of MCDN 100. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an IP-compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital subscriber line (DSL) compliant twisted pair connections between clients 120 and a node (not depicted) in access network 130 while fiber, cable or another broadband medium connects service provider resources to the node. In other embodiments, the broadband cable may extend all the way to clients 120.

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL compliant connections, switching network 140 may include elements of a DSL Access Multiplexer (DSLAM) that multiplexes many subscriber DSLs to backbone network 170.

In FIG. 1, backbone network 170 represents a private network including, as an example, a fiber based network to accommodate high data transfer rates. Backbone network 170 may provide multimedia content over large geographic areas, such as between major population centers, or across an entire national network system. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. Application server 150 may be configured to include various additional applications (not shown in FIG. 1).

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, and details for network equipment in switching network 140 and/or backbone network 170.

Figure 2:
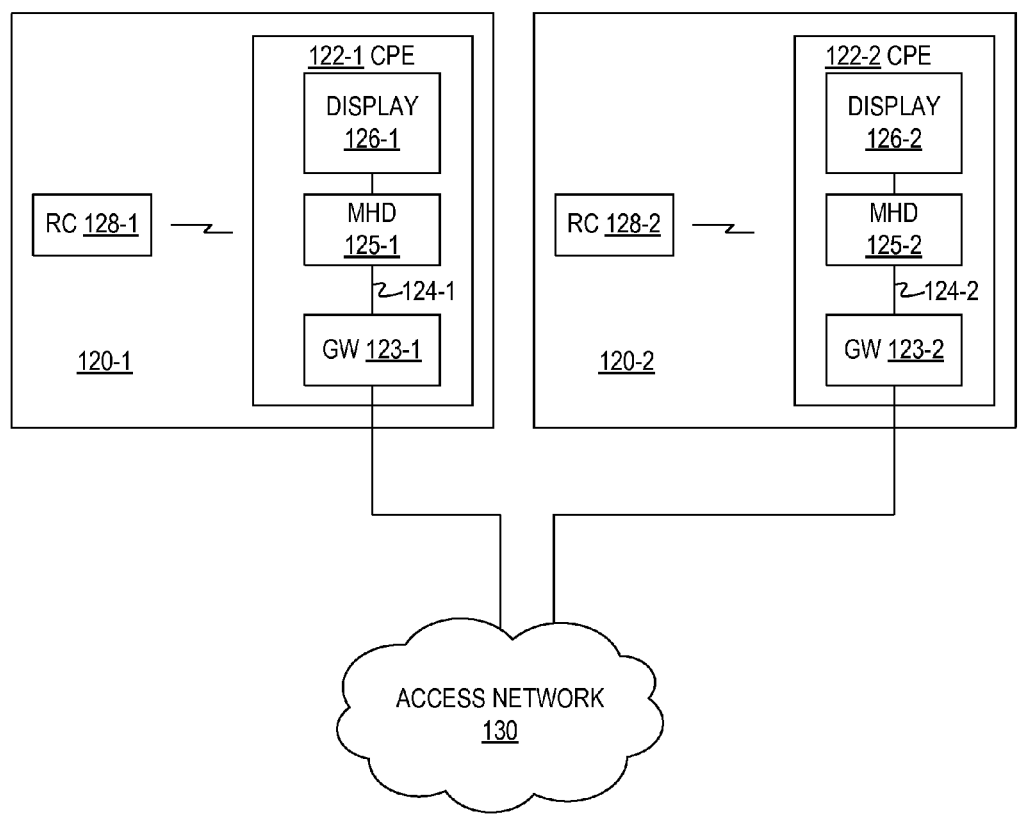
FIG. 2 is a block diagram of selected elements of an embodiment of a multimedia distribution network.

Turning now to FIG. 2, clients 120 are shown in additional detail with respect to access network 130. Clients 120 may include network appliances collectively referred to herein as CPE 122. In the depicted embodiment, CPE 122 includes the following devices: gateway (GW) 123, multi-media handling device (MHD) 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for client 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard such as National Television System Committee (NTSC), Phase Alternating Line (PAL), or another suitable standard. Display 126 may include one or more integrated speakers to play audio content.

Clients 120 are further shown with their respective remote control 128, which is configured to control the operation of MHD 125 by means of a user interface (not shown in FIG. 2) displayed on display 126. Remote control 128 of client 120 is operable to communicate requests or commands wirelessly to MHD 125 using infrared (IR) or radio frequency (RF) signals. MHDs 125 may also receive requests or commands via buttons (not depicted) located on side panels of MHDs 125. In particular, remote control 128 may be used to select programs for viewing using MHD 125 and display 126.

MHD 125 is enabled and configured to process incoming multimedia signals to produce audio and visual signals suitable for delivery to display 126 and any optional external speakers (not depicted in FIG. 2). Incoming multimedia signals received by MHD 125 may be compressed and/or encrypted, digital or analog, packetized for delivery over packet switched embodiments of access network 130 or modulated for delivery over cable-based access networks. In some embodiments, MHD 125 may be implemented as a stand-alone set top box suitable for use in a co-axial or IP-based multimedia content delivery network.

Figure 3:
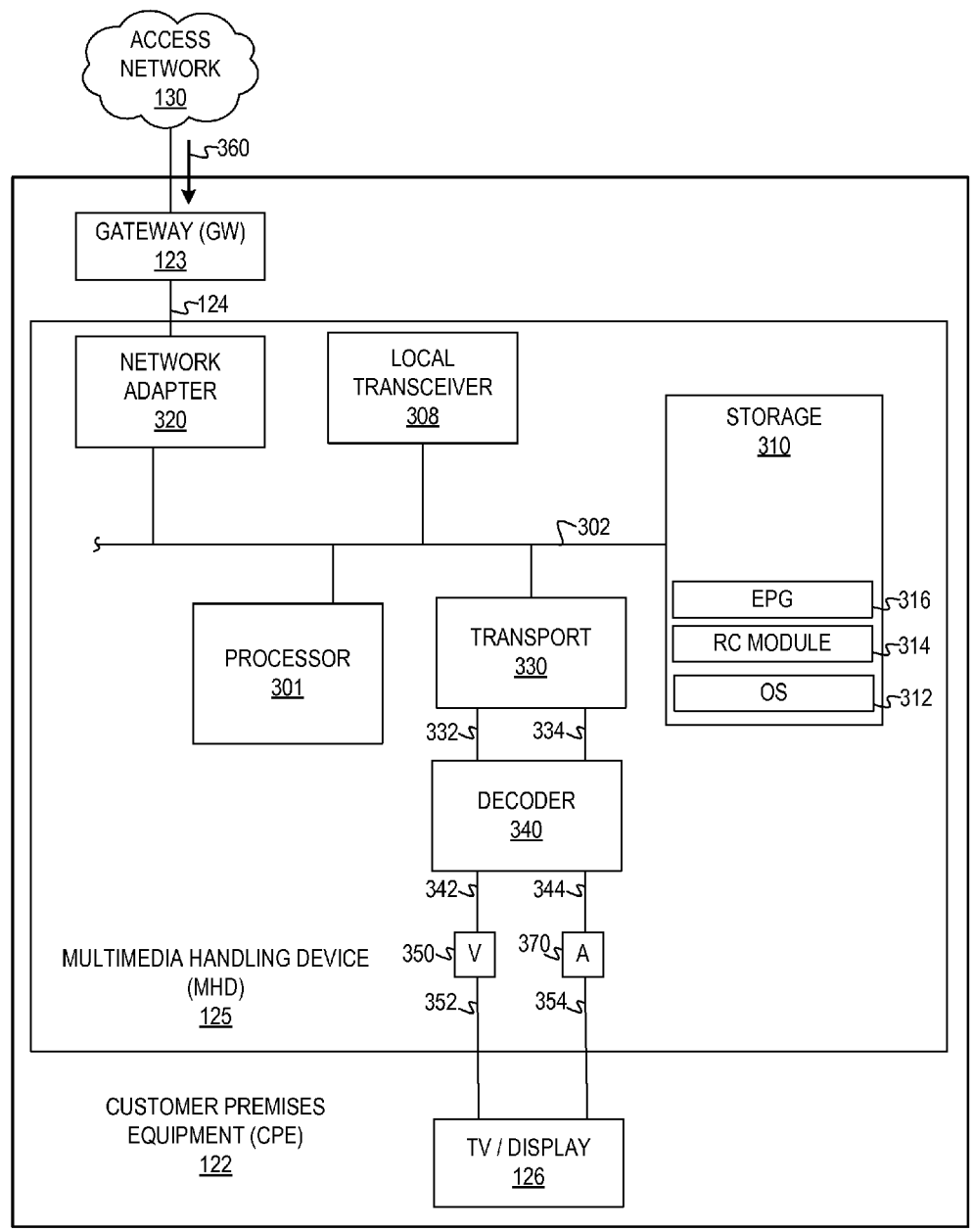
FIG. 3 is a block diagram of selected elements of an embodiment of a multimedia handling device.

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media collectively identified as storage 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in IP-based content delivery networks, MHD 125, as depicted in FIG. 3, may include transport unit 330 that assembles the payloads from a sequence or set of network packets into a stream of multimedia content. In coaxial based access networks, content may be delivered as a stream that is not packet based and it may not be necessary in these embodiments to include transport unit 330. In a coaxial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may not be a part of MHD 125. Display 126 may comply with NTSC, PAL or any other suitable television standard.

Storage 310 encompasses persistent and volatile media, fixed and removable media, and magnetic and semiconductor media. Storage 310 is operable to store instructions, data, or both. Storage 310 as shown may include sets or sequences of instructions, namely, an operating system 312, a remote control application program identified as RC module 314, and EPG 316. Operating system 312 may be a UNIX or UNIX-like operating system, a Windows® family operating system, or another suitable operating system. In some embodiments, storage 310 is configured to store and execute instructions provided as services to client 120 by application server 150, as mentioned previously.

EPG 316 represents a guide to the multimedia content provided to client 120 via MCDN 100, and may be shown to the user as an element of the user interface. The user interface may include a plurality of menu items arranged according to one or more menu layouts, which enable a user to operate MHD 125. The user may operate the user interface, including EPG 316, using remote control 128 (see FIG. 2) in conjunction with RC module 314.

Local transceiver 308 represents an interface of MHD 125 for communicating with external devices, such as remote control 128, or another universal remote control device. Local transceiver 308 may provide a mechanical interface for coupling to an external device, such as a plug, socket, or other proximal adapter. In some cases, local transceiver 308 is a wireless transceiver, configured to send and receive IR or RF or other signals. Local transceiver 308 may be accessed by RC module 314 for providing remote control functionality.

Figure 4:
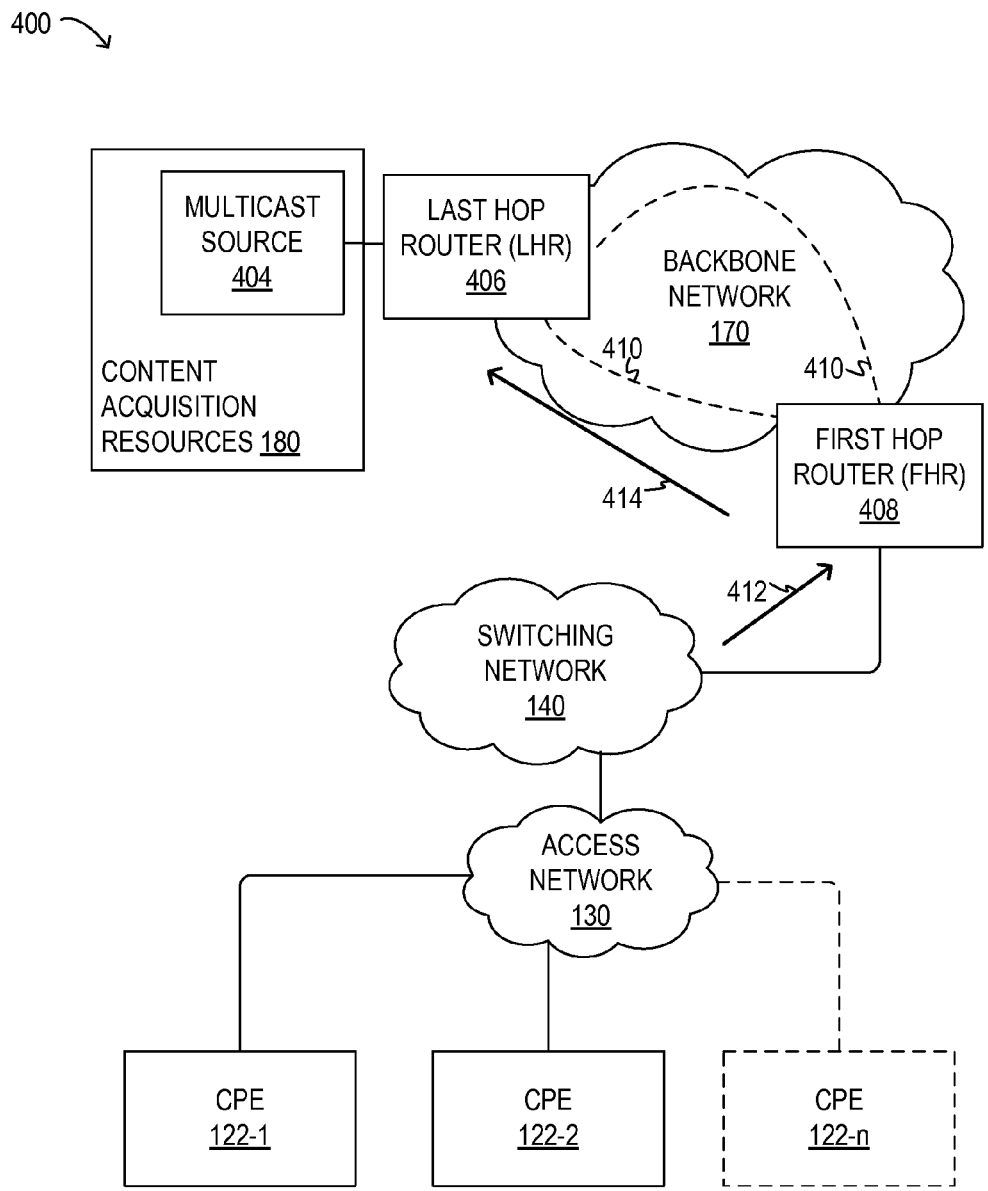
FIG. 4 is a block diagram of selected elements of an embodiment of a multimedia distribution network.

Turning now to FIG. 4, a block diagram of selected elements of an embodiment of MCDN system 400 is depicted. It is noted that like numbered elements in FIG. 4 represent components discussed above with respect to FIGS. 1-3. MCDN system 400 depicts in detail elements that may be configured to multicast IPTV channels originating at multicast source 404 to the multicast receivers, in this case, CPEs 122. Multicast source 404 may represent functionality included in content acquisition resources 180 (see FIG. 1).

In MCDN system 400, CPEs 122 may be coupled to switching network 140 via access network 130 (see also FIG. 1). Upon selection of a viewing channel at a given one of CPEs 122, for example, CPE 122-1, join message 412 may be forwarded by switching network 140 to first hop router (FHR) 408, indicating that CPE 122-1 desires to join the multicast IP group for the desired channel. In certain embodiments, join message 412 is an IGMP join message.

Backbone network 170 is depicted in MCDN system 400 including FHR 408 and last hop router (LHR) 406, representing the endpoints of multicast paths 410 within backbone network 170 for transmitting IPTV channels from multicast source 404 to switching network 140, and further to CPEs 122. LHR 406 may be directly coupled to multicast source 404 and may continuously receive network traffic, or data packet flow, representing a plurality of IPTV channels, from multicast source 404. LHR 406 may only forward desired IPTV channels once a join message for the desired IPTV channels has been received.

Upon receiving join message 412, FHR 408 may send join message 414 to LHR 406. In particular embodiments, join message 412 may be a PIM join message, and may establish particular multicast paths 410 between LHR 406 and FHR 408. It is noted that multicast paths 410 may represent ECMPs, among which network resource allocation and bandwidth cost may be substantially equal. Although two multicast paths 410 are shown in FIG. 4 for descriptive clarity, different numbers of multicast paths 410 may be established in various embodiments. Join message 414 may further include an indication of which IPTV channels are to be forwarded over multicast paths 410. In certain embodiments, the selected IPTV channels may be distributed in a round-robin fashion over multicast paths 410.

In operation, the distribution of IPTV channels may lead to various degrees of network loading over multicast paths 410. IPTV channels may include various types of channels, such as high-definition (HD) channels, standard definition (SD) channels, and picture-in-picture channels, each of which may have greatly varying data throughputs. Since the availability of multicast paths 410 represents an economic constraint in terms of network resources, the number of selected multicast paths 410 is generally not unlimited. Accordingly, certain multicasting configurations may result in non-optimal, or unbalanced, network loading of multicast paths 410.

The following example configuration illustrates a multicast configuration without load balancing. Assuming that odd numbered IPTV channels are HD channels and even numbered IPTV channels are SD channels, an allocation of four (4) IPTV channels over two (2) available ECMPs may be given by the following table:

| IPTV Channel | Multicast Path |
|---|---|
| C1 | ECMP1 |
| C2 | ECMP2 |
| C3 | ECMP1 |
| C4 | ECMP2 |

In the above example, both HD channels were allocated to ECMP1, while both SD channels were allocated to ECMP2. Since an HD channel may consume four (4) times the bandwidth of an SD channel, the network loading of ECMP1 is approximately eight (8) times the network loading of ECMP2 in this example.

The methods described herein disclose including virtual IPTV channels to achieve load balancing over the available multicast paths. A "virtual IPTV channel" may refer to an allocated IPTV channel over which no actual network traffic is transmitted. A virtual IPTV channel may be considered a channel placeholder that is allocated with a join message, such as a PIM join message. Accordingly, in MCDN system 400, join message 414 may include virtual IPTV channels. Assuming the same allocation of IPTV channels and ECMPs as in the previous example, judiciously adding virtual IPTV channels VC1 and VC2 may result in the following multicast configuration:

| IPTV Channel | Multicast Path |
|---|---|
| C1 | ECMP1 |
| VC1 | ECMP2 |
| C2 | ECMP1 |
| C3 | ECMP2 |
| VC2 | ECMP1 |
| C4 | ECMP2 |

As shown in the above table, HD channels C1 and C3 have now been distributed over ECMP1 and ECMP2, thereby balancing the network loading of this multicast configuration. In this example, virtual IPTV channels and IPTV channels have been mapped to a plurality of multicast channels. It is noted that introducing virtual IPTV channels, as described herein, may represent a relatively straightforward network configuration mechanism that may be implemented in various operational scenarios as a prevention of or a response to unbalanced network loading.

Figure 5:
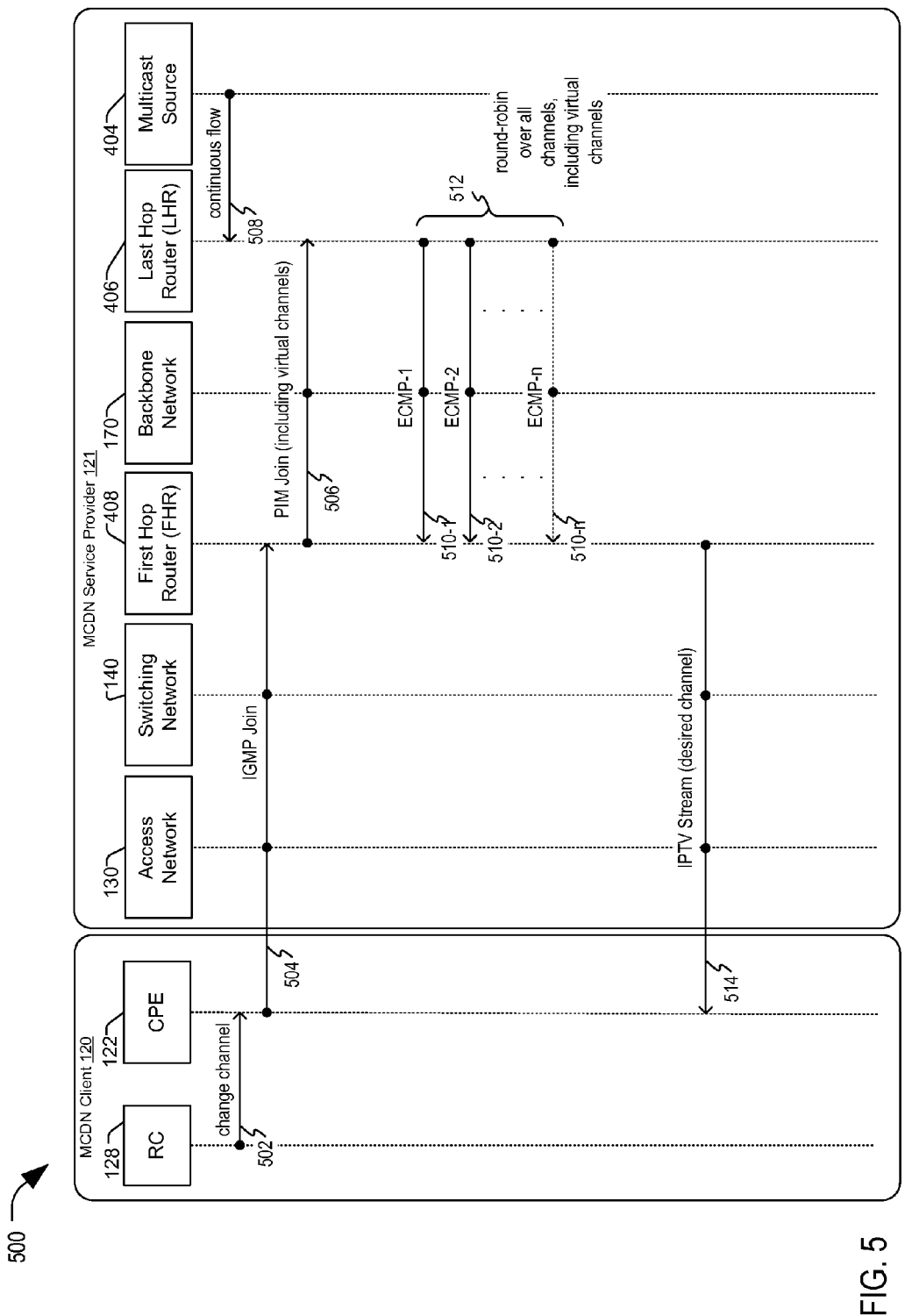
FIG. 5 illustrates an embodiment of a method for multicasting IPTV channels over a multimedia distribution network.

Referring to FIG. 5, a ladder diagram of an embodiment of method 500 for multicasting over an MCDN is shown. It is noted that like numbered elements in FIG. 5 represent components discussed above with respect to FIGS. 1-4. Method 500 includes various operations which are shown in various stages of execution.

Remote control 128 may be used to change an IPTV channel (operation 502), or select a desired IPTV channel, in conjunction with CPE 122 at an MCDN client 120. Then, IGMP join 504, reflecting CPE 122 desiring to join a multicast group receiving the desired IPTV channel, may be generated and sent to FHR 408. Accordingly, information indicative of IGMP join 504 may be forwarded from MCDN client 120 to MCDN service provider 121. In particular, IGMP join 504 may be transmitted via access network 130 and switching network 140 (see also FIG. 1) to FHR 408. It is noted that while a single MCDN client is shown in FIG. 5, method 500 may be applicable to a large number of MCDN clients 120 sending respective IGMP joins 504 to MCDN service provider 121.

FHR 408 may then issue PIM join 506 to LHR 406, specifying n number of ECMPs 510, along with the desired IPTV channel and a number of virtual IPTV channels. It is noted that LHR 406 may be in reception of continuous flow 508 of IPTV channels from multicast source 404. After receiving PIM join 506, LHR 406 may begin transmitting a plurality of IPTV channels, including the desired IPTV channel, and a plurality of virtual IPTV channels over ECMPs 510. LHR 406 may transmit the IPTV channels in round-robin manner 512, that is, a first IPTV channel over ECMP-1 510-1, then a second IPTV channel over ECMP-2 510-2, and so on, up to ECMP-n 510-n, before resuming again with ECMP-1 510-1. The round-robin manner 512 results in the IPTV channels arriving at FHR 408. FHR 408 may then forward IPTV Stream 514, including the desired IPTV channel, to CPE 122. As noted above with respect to FIG. 4, the included virtual IPTV channels may result in a load balanced multicasting over backbone network 170.

Figure 6:
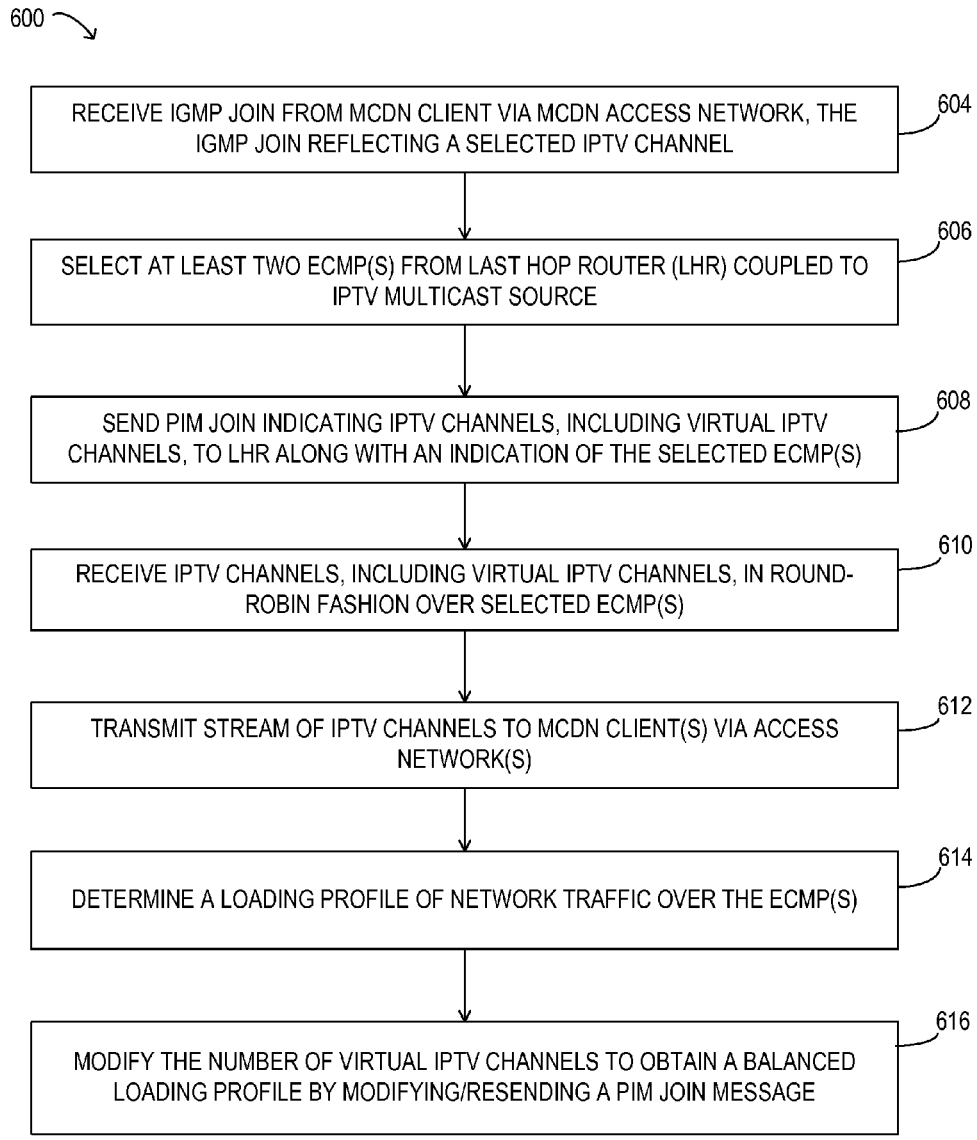
FIG. 6 illustrates an embodiment of a method for multicasting IPTV channels over a multimedia distribution network.

Turning now to FIG. 6, an embodiment of method 600 for IPTV multicasting is illustrated in flow chart form. In one embodiment, method 600 is performed by FHR 408 (see FIG. 4). Method 600 may also be performed in conjunction with functionality provided by LHR 406, switching network 140, access network 130 and CPE 122. It is noted that certain operations described in method 600 may be optional or may be rearranged in different embodiments.

An IGMP join, reflecting a selected IPTV channel, may be received from an MCDN client via an MCDN access network (operation 604). At least two ECMPs may be selected from an LHR coupled an IPTV multicast source (operation 606). For example, ECMPs 410 may provide multicast paths from LHR 406 to FHR 408 (see FIG. 4). A PIM join indicating IPTV channels, including virtual IPTV channels, may be sent to the LHR along with an indication of the selected ECMPs (operation 608). The IPTV channels, including the virtual IPTV channels, may be received in round-robin fashion over the selected ECMPs (operation 610). The stream of IPTV channels may be transmitted to MCDN client(s) via access network(s) (operation 612). A loading profile of network traffic over the ECMPs may be determined (operation 614). A number of virtual IPTV channels may be modified to obtain a balanced loading profile by modifying/resending a PIM join message (operation 616).

Figure 7:
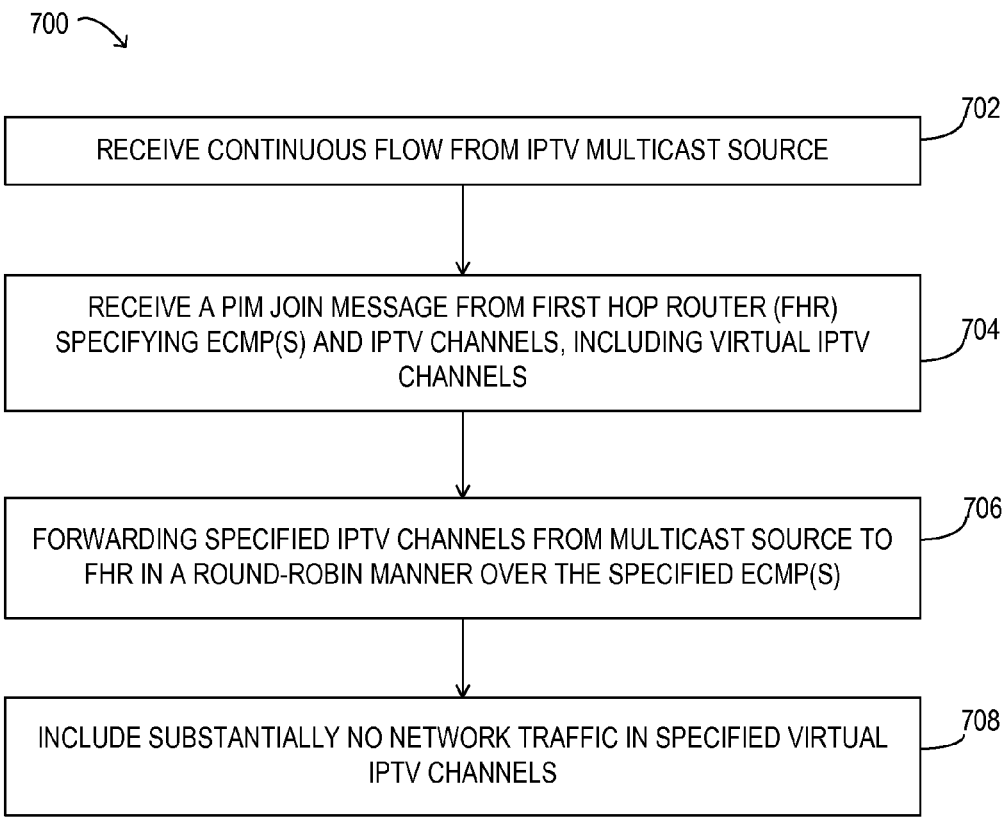
FIG. 7 illustrates an embodiment of a method for multicasting IPTV channels over a multimedia distribution network.

Turning now to FIG. 7, an embodiment of method 700 for IPTV multicasting is illustrated in flow chart form. In one embodiment, method 700 is performed by LHR 406 (see FIG. 4). Method 700 may also be performed in conjunction with functionality provided by FHR 408, switching network 140, access network 130 and CPE 122. It is noted that certain operations described in method 700 may be optional or may be rearranged in different embodiments.

A continuous flow may be received from an IPTV multicast source (operation 702). The continuous flow may represent a plurality of IPTV channels. A PIM join message, specifying ECMPs and IPTV channels, including virtual IPTV channels, may be received from an FHR (operation 704). The specified IPTV channels may be forwarded from the multicast source to the FHR in a round-robin manner over the specified ECMPs (operation 706). Substantially no network traffic may be included in the specified virtual IPTV channels (operation 708).

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A multicasting method, comprising:
responsive to detecting a message identifying an initial group of television channels associated with a multicast group and a set of multicast paths, mapping each of the initial group of television channels to one of a corresponding one of the set of multicast paths;
monitoring multicast path workloads; and
responsive to detecting unbalanced traffic loading associated with the set of multicast paths, performing operations comprising:
adding a virtual channel to the initial group of television channels to define a modified group of channels, wherein the virtual channel comprises a placeholder channel not intended for television content; and
mapping each of the channels, including the virtual channel, in the modified group of channels to one of the set of multicast paths.

2. The method of claim 1, further comprising:
wherein mapping includes distributing the television channels and any virtual channels, to the set of multicast paths in a round robin fashion.

3. The method of claim 1, further comprising:
specifying a number of multicast paths in the set of multicast paths.

4. The method of claim 1, further comprising:
modifying the number of virtual channels in response to detecting the unbalanced loading and remapping.

5. The method of claim 4, wherein the multicast paths comprise equivalent cost multicast paths between a last hop router and a first hop router.

6. A multimedia content router, comprising:
a processor; and
computer storage media accessible to the processor, including processor executable instructions that, when executed by the processor, cause the processor to perform operations comprising:
responsive to detecting a message identifying an initial group of television channels associated with a multicast group and a set of multicast paths, mapping each of the initial group of television channels to one of a corresponding one of the set of multicast paths;
monitoring multicast path workloads; and
responsive to detecting unbalanced traffic loading associated with the set of multicast paths,
performing operations comprising:
adding a virtual channel to the initial group of television channels to define a modified group of channels, wherein the virtual channel comprises a placeholder channel not intended for television content; and
mapping each of the channels, including the virtual channel, in the modified group of channels to one of the set of multicast paths.

7. The multimedia content router of claim 6, wherein the mapping of the modified group of channels improves a balancing of a profile of network traffic loading.

8. The multimedia content router of claim 6, wherein the operations include:
selecting a television channel from a plurality of television channels arriving from a multicast source.

9. The multimedia content router of claim 8, wherein the multicast group includes a plurality of television channels and a plurality of no-traffic channels.

10. The multimedia content router of claim 6, wherein the mapping of the initial group of television channels is performed responsive to detecting a join message associated with a channel change initiated by a user and wherein the operations include:
determining a number of no-traffic channels required to achieve a balanced loading profile.

11. The multimedia content router of claim 10, wherein the message comprises a join message associated with a channel change initiated by a user.

12. The multimedia content router of claim 10, wherein the operations include:
adjusting the number of no-traffic channels in response to a change in loading profile.

13. A non-transitory computer-readable storage medium, including processor executable instructions that, when executed by a processor, cause the processor to perform operations comprising:
responsive to detecting a message identifying an initial group of television channels associated with a multicast group and a set of multicast paths, mapping each of the initial group of television channels to one of a corresponding one of the set of multicast paths;
monitoring multicast path workloads; and
responsive to detecting unbalanced traffic loading associated with the set of multicast paths,
performing operations comprising:
adding a virtual channel to the initial group of television channels to define a modified group of channels, wherein the virtual channel comprises a placeholder channel not intended for television content; and
mapping each of the channels, including the virtual channel, in the modified group of channels to one of the set of multicast paths.

14. The storage medium of claim 13, wherein each of the multicast paths corresponds to a path between a first hop router and a last hop router.

15. The storage medium of claim 14, wherein the multicast paths comprise equal cost multicast paths.

16. The storage medium of claim 13, wherein the operations include mapping a plurality of television channels and a plurality of no-traffic channels to the multicast group.

17. The storage medium of claim 13, wherein the operations includes:
determining a number of no-traffic channels required to achieve a balanced loading profile.

18. The storage medium of claim 17, wherein the message comprises a join message associated with a channel change initiated by a user.

19. The storage medium of claim 17, wherein the operations include:
adjusting the number of no-traffic channels in response to a change in loading profile.

20. The storage medium of claim 18, wherein the join message comprises a protocol independent multicast join message.

* * * * *